(12) United States Patent
Moran et al.

(10) Patent No.: US 7,893,382 B2
(45) Date of Patent: Feb. 22, 2011

(54) STUD WELDER

(75) Inventors: Sean Patrick Moran, Neenah, WI (US); Tim Alan Matus, San Antonio, TX (US); Mark Ulrich, New London, WI (US)

(73) Assignee: Illionois Tool Works Inc., Glenview, IL (US)

( * ) Notice: Subject to any disclaimer, the term of this patent is extended or adjusted under 35 U.S.C. 154(b) by 1678 days.

(21) Appl. No.: 10/250,108

(22) Filed: Jun. 4, 2003

(65) Prior Publication Data

US 2004/0245219 A1 Dec. 9, 2004

(51) Int. Cl.
B23K 9/20 (2006.01)
(52) U.S. Cl. .......................................... 219/99; 219/98
(58) Field of Classification Search .................. 219/98, 219/99
See application file for complete search history.

(56) References Cited

U.S. PATENT DOCUMENTS

| | | |
|---|---|---|
| 5,662,820 A | 9/1997 | Schwiete et al. |
| 5,712,771 A * | 1/1998 | Fitter et al. .................... 363/17 |
| 5,798,494 A | 8/1998 | Aoyama et al. |
| 5,820,323 A | 10/1998 | Barandun |
| 6,105,752 A | 8/2000 | Liebich et al. |
| 6,186,391 B1 | 2/2001 | Barandun |
| 6,339,320 B1 * | 1/2002 | Spremo et al. ............... 323/355 |
| 6,713,708 B2 * | 3/2004 | Hedberg ....................... 219/98 |
| 2003/0132211 A1 * | 7/2003 | Aigner ................... 219/130.21 |

FOREIGN PATENT DOCUMENTS

| | | |
|---|---|---|
| EP | 338563 | 10/1989 |
| EP | 0 474 031 A | 3/1992 |
| EP | 658392 A1 | 6/1995 |
| JP | 02104473 A | 4/1990 |
| JP | 4-4977 A * | 1/1992 |

* cited by examiner

Primary Examiner—Clifford C. Shaw
(74) Attorney, Agent, or Firm—Ziolkowski Patent Solutions Group, SC

(57) ABSTRACT

An appartus and method for a stud welder power source is disclosed. The power source has a control circuit connected to an inverter which converts an electrical signal from a power source into an electrical signal that can perform stud welding. The inverter conditions the power signal such that a current of at least 1000 amps can be generated nearly instantaneously. Additionally, having a power source that includes a control circuit with an inverter allows for a smaller and lighter apparatus when compared to known stud welders.

27 Claims, 5 Drawing Sheets

STUD WELDER

BACKGROUND OF INVENTION

The present invention relates generally to welding systems and, more particularly, to a stud welder having an inverter power source.

Stud welding is a welding process that utilizes a localized burst of current between a metallic fastener and a metallic work piece. In most instances, although not required, the fastener and the work piece have the same material properties. The fasteners are held and welded in place through the use of an electromechanical device know as a stud gun. A stud welding system has a power source, a stud gun, a pair of cables, and a stud.

Stud welding has applications in many industries. These industries include boiler manufacturing, ship building, auto manufacturing, and construction to name but a few. The work environment in each of these trades is often polluted with dust, dirt, and debris and heavily congested with other equipment and tools. Any equipment operated under these conditions preferably should be designed with these conditions in mind in order to allow easy transport and to extend the life cycle of the equipment.

Stud welder power sources are required to generate and discharge a high current output in a short period of time. Many stud welder power supplies are either manually operated or operated by other equipment such as robotic arms. In order to maintain the quality of the stud weld and maintain operating efficiencies, stud welder power sources need to be both durable and reliable such that the device can produce repeatable results regardless of the method of operation.

Power sources used for stud welding generally provide a constant current. This constant current is generally provided by controlled release of a capacitive discharge or a transformer rectifier. Stud welder power sources that are of the transformer rectifier type are generally iron core based. The majority of stud welder power sources have an iron core base. As with all iron core based power sources, a design consideration involves the logistics and accessibility of the power source. Due to the power output requirements demanded of stud welders, the stud welder power sources are generally large, bulky, and heavy. Such a construction produces limitations on both portability and accessibility of the stud welding power source.

Known stud and stick welders have power sources that typically use silicon-controlled rectifiers (SCRs) to control the welder output. The SCRs are controlled by a circuit board and rectify and control the welder output. These systems provide fewer moving parts than mechanical control systems, such as a brush or tap controlled transformers, and can be remotely controlled. These systems also provide signal control over input power fluctuations such that the fluctuations minimally effect the welder output. Unfortunately, these systems have a limited switching speed, are often challenging to troubleshoot and repair, and are only marginally lighter than mechanically controlled power sources.

Another type of power source is commonly known as an inverter power source. Inverter power sources first rectify incoming power to a direct current. This signal is then filtered for smoothness and sent through power switches that convert the signal back to AC, but at an increased frequency. A transformer steps-down the signal prior to the signal being rectified a second time to DC current. The inverter power source produces a relatively smooth current output, but heretofore, not sufficiently high enough, nor fast enough for stud welding.

Therefore, it would be desirable to have system that allows for a light weight power source to generate an electrical signal capable of welding a stud to a work piece in a quick and repeatable manner. Additionally, the stud welder power source should also be robust and durable.

BRIEF DESCRIPTION OF INVENTION

The present invention is directed to a stud welder power supply that solves the aforementioned drawbacks. The present invention provides a system and method for a stud welder power source that is lightweight, durable, and reliable. The stud welder has a circuit board connected to an inverter power source that controls the power supplied to a stud welding gun. The stud welding gun maintains position of a stud during the welding arc while the stud is being welded to a work piece. The inverter power source regulates supply of power to the stud welding gun such that adequate power is supplied to the stud welding gun to weld the stud to the work piece.

Therefore, in accordance with one aspect of the present invention, a stud welder has a control circuit connected to an inverter power source to regulate power to a stud welding gun. The inverter power source supplies short bursts of high amperage power to the stud welding gun. The high amperage power has a rise time of at least 600 amps per millisecond such that the welding process begins nearly instantaneously, and ends sooner than prior art techniques.

In accordance with another aspect of the present invention, a stud welding apparatus has a stud welding gun and a power source having a plurality of power switching transistors. The power switching transistors provide power to the stud welding gun above a frequency of 15 kHz according to a substantially step function such that once a frequency of at least 15 kHz is achieved, the stud welding gun is provided with power.

In accordance with a further aspect of the present invention, a method of providing a stud welding apparatus is disclosed that includes providing an inverter power source to output current of at least 1000 amps, and generating welding power having a rise time to pulse width ratio of approximately 1:750.

Therefore, the present invention provides a stud welder power source with an inverter power source that controls output power to a stud welding gun. Such a construction allows for a light weight construction of a stud welder while generating a high current output signal which reaches an output level in a relatively rapid time.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

Figure 1:
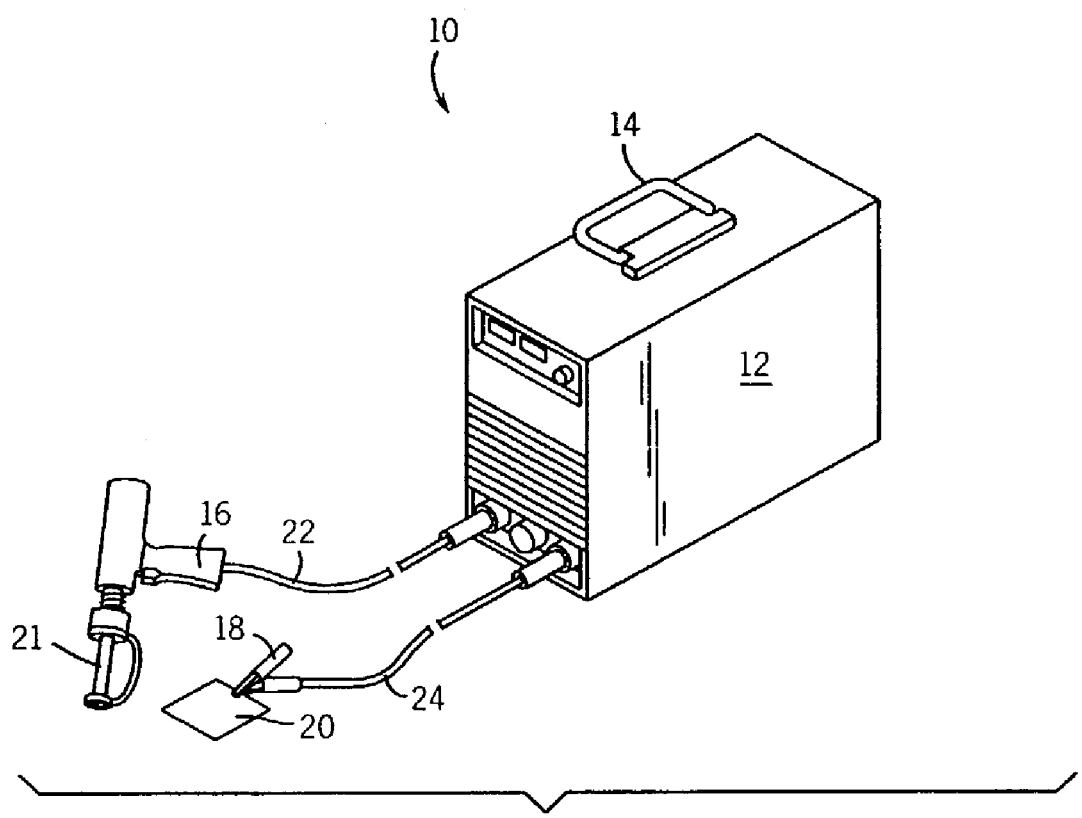
FIG. 1 is a perspective view of the stud welder apparatus according to the present invention.

FIG. 1 shows a stud welding system 10 in accordance with the present invention. Stud welding system 10 includes a housing 12 enclosing the internal components of the welding power source including a circuit board and inverter power source as will be described in greater detail with reference to FIGS. 3 and 4. The stud welding device 10 is of such compact construction, that it includes a handle 14 for easily transporting the welding system from one location to another. Since this stud welder weighs a mere 65–75 pounds, it can easily be moved by one person. To effectuate the welding process, the stud welding device 10 includes a stud welding gun 16 as well as a work clamp 18. The work clamp 18 is configured to complete the welding circuit to a workpiece 20 to be welded. Connecting the stud welding gun 16 and work clamp 18 to the housing 12 is a pair of cables 22 and 24, respectively.

Figure 2:
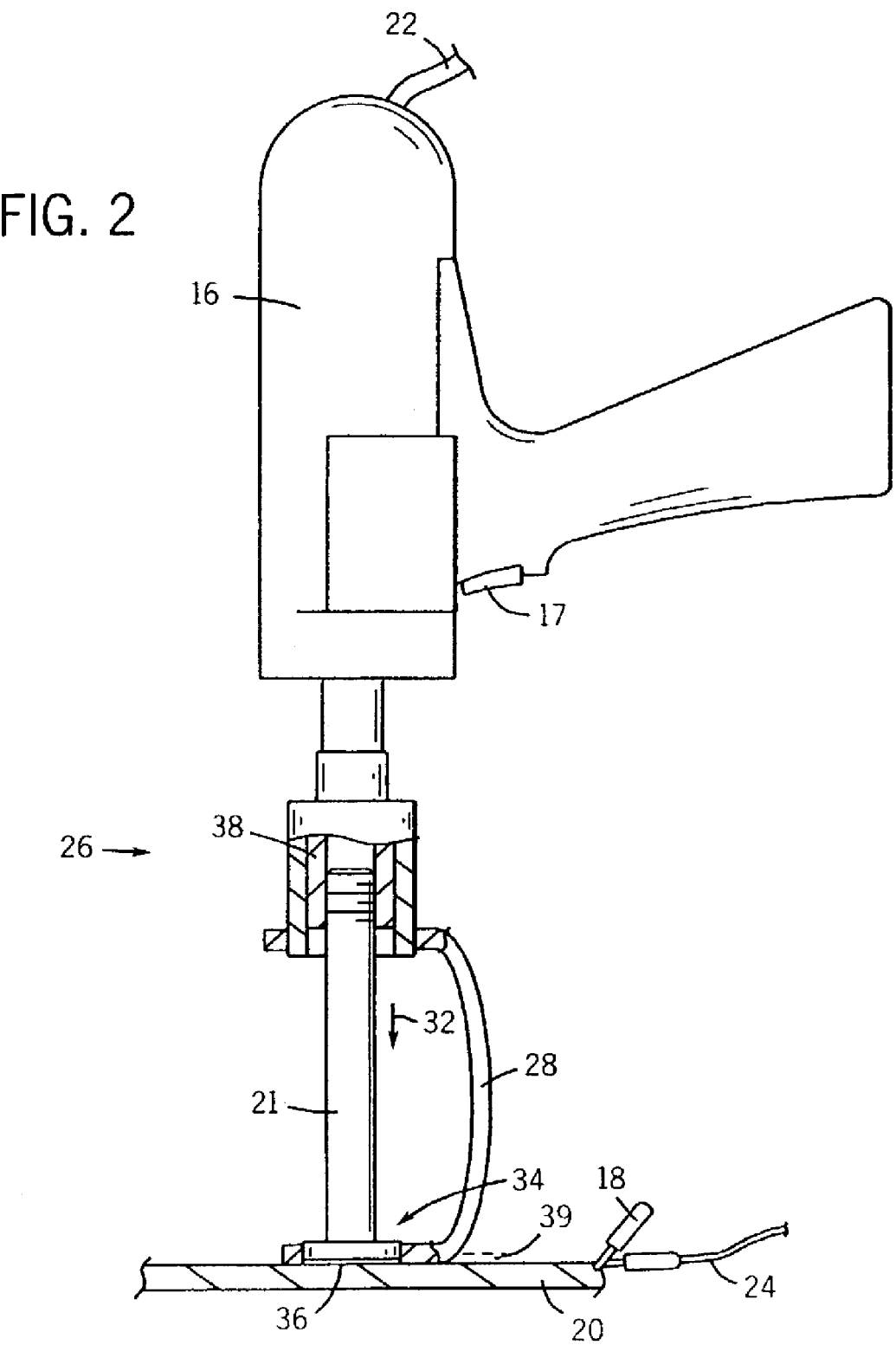
FIG. 2 is a side view of the stud welding gun of FIG. 1 in use.

As shown in FIG. 2, a stud 21 is placed in a work end 26 of stud welding gun 16 and in abutting engagement with work piece 20. When a trigger 17 of stud welding gun 16 is pressed, a welding current is developed between the welding gun 16 and work piece 20 through stud 21. An arm 28 of stud welding gun 16 is used to accommodate stud 21 and allow drawing stud 21 away from work piece 20 to form a stud welding arc. Once the arc is formed, an electrical current 32 passes through stud 21 and work piece 20. As electrical current 32 passes through stud 21 and work piece 20, a distal end 34 of stud 21 and a target point 36 of work piece 20 become molten. An inner collet 38 of stud welding gun 16 maintains a distance 39 between stud 21 and work piece 20. Distance 39 is determined to be the distance required to form a proper welding arc between the stud 21 and work piece 20. After a predetermined time, stud 21 is driven into work piece 20 thereby forming a homogenous weld between stud 21 and work piece 20. Although a specific stud welding gun and stud are shown, it is understood that such is merely by way of example. Such is not intended to limit the scope of the claims presented herein.

As shown in FIG. 2, a stud 21 is placed in a work end 26 of stud welding gun 16 and in abutting engagement with work piece 20. When a trigger 17 of stud welding gun 16 is pressed, a welding current is developed between the welding gun 16 and work piece 20 through stud 21. An arm 28 of stud welding gun 16 is used to accommodate stud 21 and allow drawing stud 21 away from work piece 20 to form a stud welding arc. Once the arc is formed, an electrical current 32 passes through stud 21 and work piece 20. As electrical current 32 passes through stud 21 and work piece 20, a distal end 34 of stud 21 and a target point 36 of work piece 20 become molten. An inner collet 38 of stud welding gun 16 maintains a distance 39 between stud 21 and work piece 20. Distance 39 is determined to be the distance required to form a proper welding arc between the stud 21 and work piece 20. After a predetermined time, stud 21 is driven into work piece 20 thereby forming a homogenous weld between stud 21 and work piece 20. Although a specific stud welding gun and stud are shown, it is understood that such is merely by way of example. Such is not intended to limit the scope of the claims presented herein.

Figure 3:
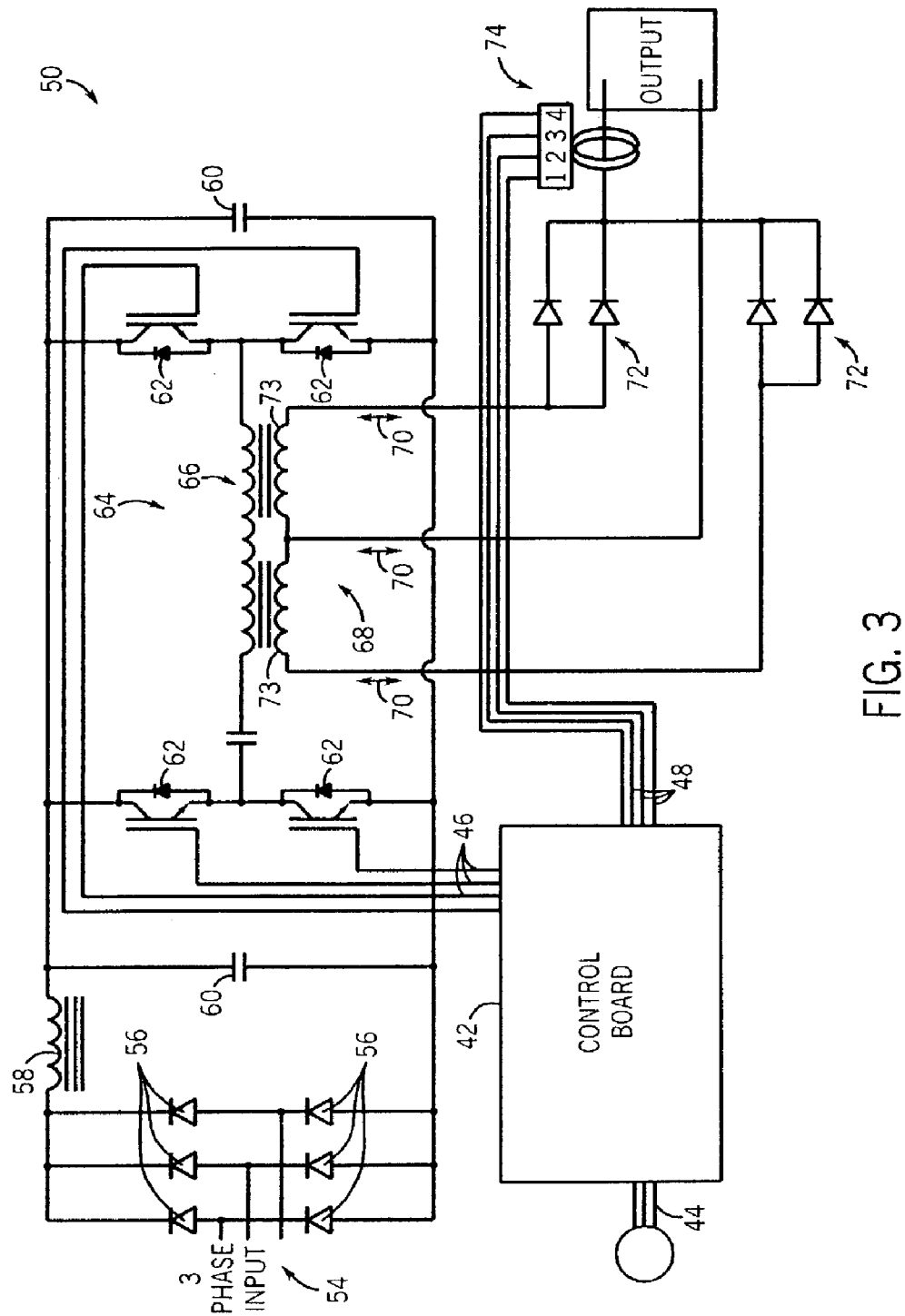
FIG. 3 is a circuit schematic of an inverter power source of the stud welder shown in FIG. 1.

Referring to FIG. 3, a circuit schematic of an inverter power source 50 of the stud welder power source is shown. Preferably, the inverter power source is of a resonant converter type. The stud welder power source has a control board 42 which includes a plurality of user inputs 44, a plurality of switch control outputs 46, and a plurality of input sensor leads 48. Control board 42 will be discussed in further detail with reference to FIG. 4. Switch control inputs 46 and input sensor leads 48 are electrically connected to the inverter power source 50. The inverter power source is configured to manipulate a power signal to produce a desired output signal. The output signal of the inverter power source of the present invention is conditioned for stud welding. The nature of the components of the inverter power source allows a power source that can be smaller in size, has enhanced power efficiencies, offers faster switching, and improved arc characteristics over SCR based welder power sources.

Inverter power source 50 is supplied with power by a 60 Hz power supply (not shown) which supplies an input signal 54, in this case, having three phases. The power supply could be either a conventional wall outlet or supplied by an internal combustion engine having an electrical generator attached thereto. Input signal 54 is an AC signal that is first rectified to DC by a plurality of rectifiers 56. Input signal 54 then passes through a filter 58 in order to smooth a voltage ripple from input signal 54. A pair of capacitors 60 is connected to inverter power source 50 in parallel with a plurality of power switches 62. The power switches 62 convert the rectified and filtered input signal 54 back into an AC signal, but at a much higher frequency. Power switches 62 are preferably IGBTs with capacity values of approximately 600 volts, 150 amps, and switch at frequencies above 15 kHz. Other power switches may be used as technology advances. The switching of power switches 62 is controlled by switch controls 46 of control board 42 which control the gate drive signals of each of the JGBTs 62.

A transformer 64 has an input side 66 that is connected to power switches 62 and an output side 68 which supplies an output signal 70 to the welder cables 22, 24 as shown in FIG. 1. Transformer 64 steps down the high frequency AC signal by a ratio of approximately 10:1 from input side 64 to output side 68 of transformer 64. Output signal 70, being an AC signal, is rectified by a pair of output diodes 72 to a DC signal. Each pair of output diodes 72 is connected to each end 73 of output side 68 of transformer 64. After being rectified to a DC signal at output diodes 72, output signal 70 is monitored at a current sensor 74. Current sensor 74 is connected to input sensor leads 48 of control board 42 which monitors the performance and energy requirements of inverter power source 50.

The energy required to weld a stud to a workpiece can be considered the power output for the welder power source. The power output for the welder power source is calculated by a function that has switching frequency of the power switches and the size of the iron core as variables in the denominator. The numerator can be assumed, for this purpose, to be constant. This being the case, the power output of the welder power source is determined by an inverse relationship between the size of the iron core and the switching frequency of the power switches. As such, a welder power source having a higher switching frequency, can have a reduced iron core size and can still generate as much, if not more, power as a welder power source with a large iron core value and a low switching frequency. A significant weight savings is achieved with a welder power source having a high switching frequency and reduced iron core size over a welder power source having a low switching frequency and high iron core value. A stud welder power source with the latter properties weighs approximately 250–350 pounds and therefore cannot be easily transported. The stud welder of the present invention is substantially lighter at approximately 70 pounds and is about one-fourth the size. Additionally, the use of IGBTs as high frequency power switches, being lighter than SCRs and mechanical switches, allows for additional weight reduction of the stud welder of the present invention over known stud welders.

Figure 4:
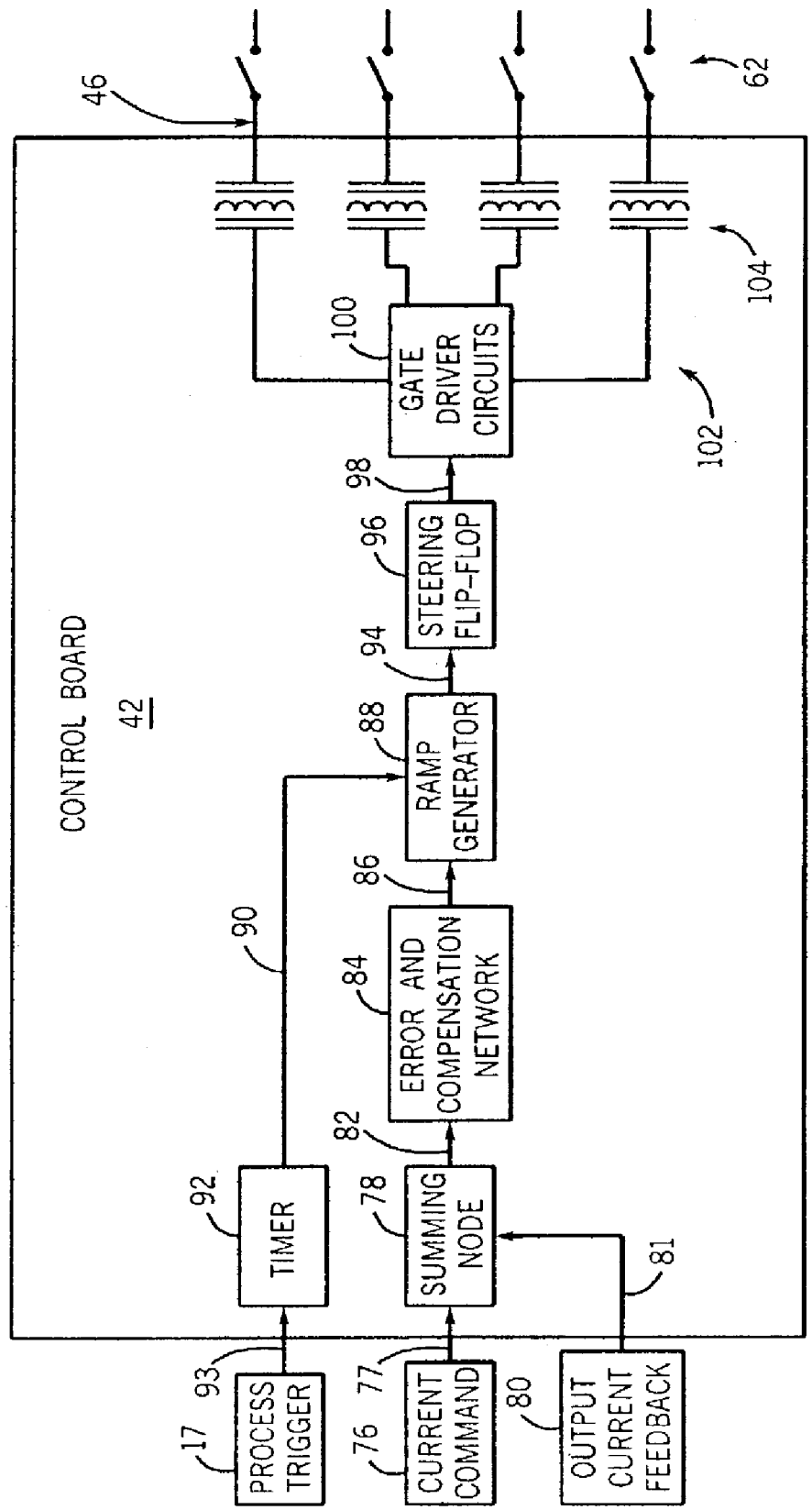
FIG. 4 is a block diagram of the control board of FIG. 3.

Control board 42 controls the operation of inverter power source 50 through several user inputs. As shown in FIG. 4, control board 42 has inputs 77 and 81. A current command 76 is first selected by the user and input into a summing node 78 of control board 42 at input 77. Also input into summing node 78 of control board 42 is an output current feedback 80 measured by sensor 74 as shown in FIG. 3 and input into summing node 78 at input 81. Summing node 78 has an output 82 that is input into an error and compensation network 84. Error and compensation network 84 measures predetermined operating parameters of stud welder power source such that the device cannot be overstressed by the user. Error and compensation network 84 has an output 86 which forms a portion of the input to a ramp generator 88. Another input to ramp generator 88 is received from an output 90 of a timer 92 of control board 42. Timer 42 receives an input 93 from trigger 17 of stud welding gun 16. Output 90 of timer 42 initiates the process for the stud welder power source to provide the selected output for the welding process.

Ramp generator 88 has an output 94 which provides the input to a steering flip-flop 96 which sends an output 98 to a gate driver circuit 100 for each pulse transformer 104. Gate driver circuits 100 have an output 102 which provides the input to a plurality of pulse transformers 104. Pulse transformers 104 condition the electrical signal such that the pulse transformers 104 control the gates of IGBTs 62 of inverter power source 50 of the stud welder 10. As such, control board 42 controls the operation of inverter power source 50 by controlling and providing the switching signal 46 to the power switches 62 of the inverter power source 50.

Figure 5:
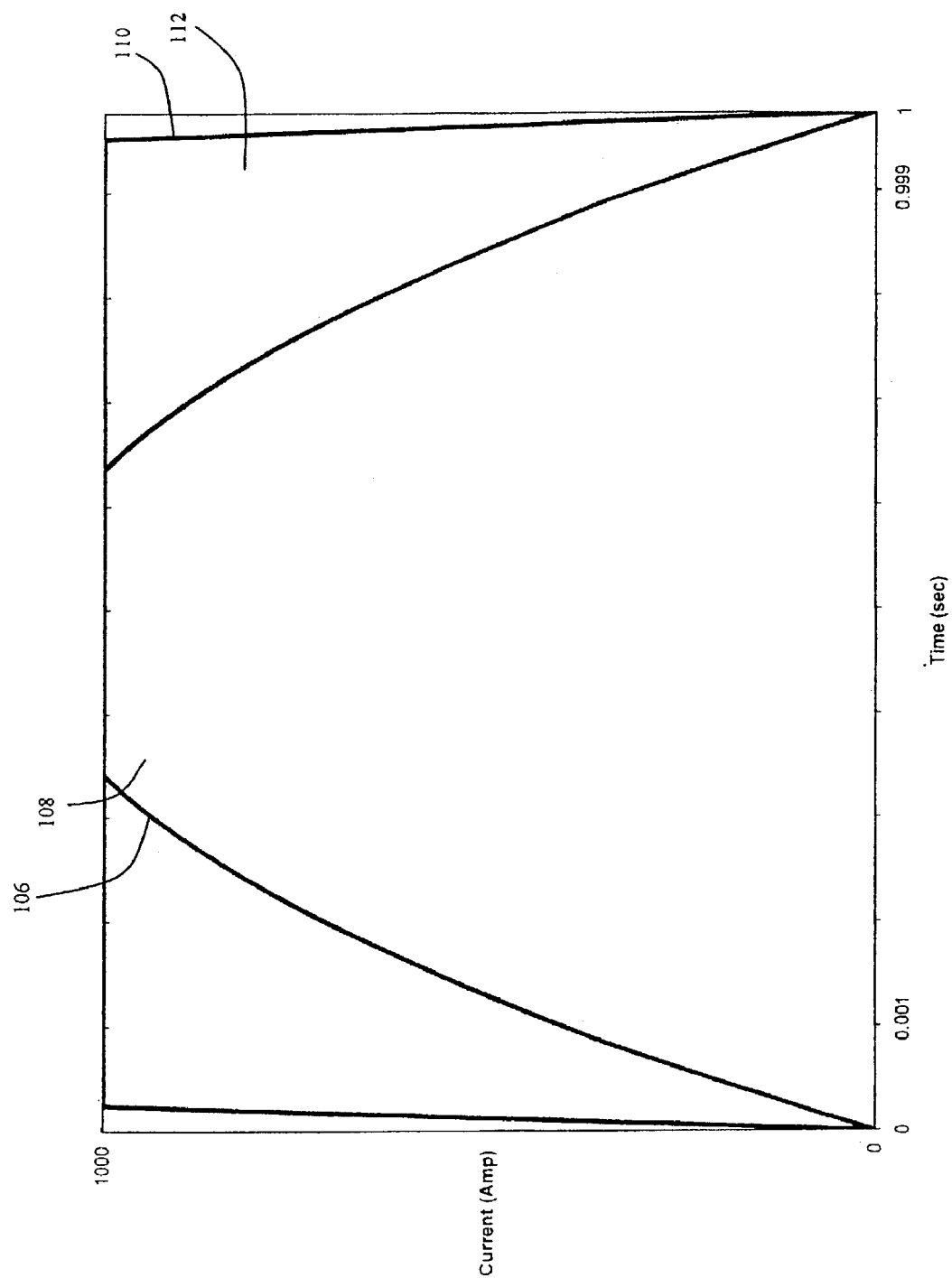
FIG. 5 is a graphical representation comparing the output of known stud welders to the stud welder of FIG. 1.

Inverter power source 50, as described above, allows the stud welder to reach operating currents of at least 1000 amps in approximately 1 millisecond. FIG. 5 depicts the significant distinction of the output of a stud welder constructed as proposed versus the prior art SCR construction. FIG. 5 shows time on the x-axis and current on the y-axis. A substantially sinusoidal curve 106 represents the power signal generated by prior art stud welders using SCRs. The area under the curve 108 represents the power used to weld. The rise time of the operating current of the present invention is at least 600 amps per millisecond, but can reach 4000 amps per millisecond. Curve 110 shows the rise time of the output of a welder constructed in accordance with the invention.

As shown, curve 110 is substantially step-function shaped. As such, the user selected current is provided by the inverter power source nearly instantaneously, providing faster response time and a more energy efficient weld. Having a power curve that is substantially step function shaped creates another benefit over known stud welders in that since the area 112 under curve 110 is significantly greater than that of the area 108 under curve 106, the weld time can be reduced. As such, not only does the stud welder require less time to reach operating currents, but if the weld time is held constant, the present stud welder also allows larger sized studs to be welded at lower operating currents. That is, a stud that may take 1200 amps to weld using SCRs can be welded in the same amount of time at approximately 1000 amps because the target amperage is achieved much faster than stud welders that utilize SCRs or mechanical switches and as a result, stud welder 10 can generate an equal amount of energy with a lower maximum current. As such, the stud receives the same overall amount of energy but with a lower maximum value.

Therefore, in accordance with one embodiment of the present invention, a stud welder has a control circuit connected to an inverter power source to regulate power to a stud welding gun. The inverter power source supplies short bursts of high amperage power, having a rise time of at least 600 amps per millisecond, to the stud welding gun.

In accordance with another embodiment of the present invention, a stud welding apparatus has a stud welding gun and a power source having a plurality of power switching transistors. The power switching transistors provide power above a frequency of 15 kHz to the stud welding gun according to a substantially step function.

In accordance with a further embodiment of the present invention, a method of providing a stud welding apparatus is disclosed that includes providing an inverter power source to output current of at least 1000 amps and generating welding power having a rise time to pulse width ratio of approximately 1:750.

The present invention has been described in terms of the preferred embodiment, and it is recognized that equivalents, alternatives, and modifications, aside from those expressly stated, are possible and within the scope of the appending claims.

What is claimed is:

1. A stud welder comprising:
   a stud welding gun;
   an inverter power source including an inverter having a plurality of IGBT power switches; and
   a control circuit connected to the inverter power source to regulate power to the stud welding gun and supply power in short bursts of high amperage having a rise time of at least 600 amps per millisecond.

2. The stud welder of claim 1 wherein the stud welding gun is a drawn arc type stud welding gun.

3. The stud welder of claim 1 wherein the stud welder has a transformer with a 10:1 ratio and weighs less than 100 pounds.

4. The stud welder of claim 1 wherein the inverter is a resonant converter type of inverter.

5. The stud welder of claim 1 wherein the inverter is a high frequency switching inverter capable of supplying at least approximately 1000 amps for a second.

6. The stud welder of claim 5 wherein the inverter switches at frequencies above 15 kHz.

7. The stud welder of claim 1 wherein the rise time is approximately 4000 amps per millisecond.

8. The stud welder of claim 1 wherein the plurality of IGBTs power switches is capable of switching 450 volts and 150 amps at 15 kHz. Moran et al.

9. The stud welder of claim 1 wherein the inverter power source has at least two outputs having at least two diodes per output.

10. A stud welding apparatus comprising:
    a stud welding gun;
    a power source having a plurality of IGBT power switching transistors providing power above a frequency of 15 kHz and configured to supply power to the stud welding gun according to a substantially step function.

11. The stud welding apparatus of claim 10 wherein the power source has a rise time of at least 600 amps per millisecond.

12. The stud welding apparatus of claim 10 wherein the power source has a rise time between 3000 and 4000 amps per millisecond.

13. The stud welding apparatus of claim 10 wherein the stud welding gun is a drawn arc type.

14. The stud welding apparatus of claim 10 wherein the substantially step function has a 1 millisecond rise time for an approximately 1200 amp current.

15. The stud welding apparatus of claim 10 wherein the plurality of IGBT power switching transistors form a high frequency switching inverter capable of supplying at least 1000 amps for one second.

16. The stud welding apparatus of claim 15 wherein the high frequency switching inverter switches at approximately 34 kHz.

17. The stud welding apparatus of claim 10 wherein the switching frequency of the plurality of IGBT power switching transistors is between 30 kHz to 60 kHz. Moran et al.

18. The stud welding apparatus of claim 10 wherein the stud welding apparatus weighs approximately 70 pounds.

19. The stud welder apparatus of claim 10 further comprising a transformer having a 10:1 turn ratio and at least two outputs having at least two diodes connected to each output.

20. A method of providing a stud welding apparatus comprising the steps of:
   providing an inverter power source having an IGBT-based inverter to output current of at least 1000 amps; and
   generating welding power having a rise time and a pulse width wherein the ratio between the rise time and the pulse width is approximately 1:750.

21. The method of claim 20 further comprising providing a stud welding gun.

22. The method of claim 21 wherein the stud welding gun draws a stud away from a work piece prior to welding.

23. The method of claim 20 wherein the welding power signal is generated by the IGBT-based inverter that switches at approximately 34 kHz.

24. The method of claim 23 wherein the IGBT-based inverter is capable of supplying at least 1000 amps for one second.

25. The method of claim 20 further comprising substantially eliminating output inductance on the IGBT-based inverter.

26. The method of claim 20 wherein the IGBT-based inverter is a high frequency switching inverter having a switching frequency between 30 kHz to 60 kHz. Moran et al.

27. The method of claim 20 wherein a 1000 amp welding power is generated three times in one minute.

* * * * *